(12) United States Patent
Compton et al.

(10) Patent No.: US 8,164,669 B2
(45) Date of Patent: Apr. 24, 2012

(54) CHARGE-COUPLED DEVICE IMAGE SENSOR WITH EFFICIENT BINNING OF SAME-COLOR PIXELS

(75) Inventors: John T. Compton, LeRoy, NY (US); David N. Nichols, Fairport, NY (US)

(73) Assignee: Truesense Imaging, Inc., Rochester, NY (US)

( * ) Notice: Subject to any disclaimer, the term of this patent is extended or adjusted under 35 U.S.C. 154(b) by 624 days.

(21) Appl. No.: 12/339,114

(22) Filed: Dec. 19, 2008

(65) Prior Publication Data

US 2010/0157126 A1 Jun. 24, 2010

(51) Int. Cl.
*H04N 5/335* (2011.01)
(52) U.S. Cl. .................................. 348/311; 348/322
(58) Field of Classification Search .......... 348/311–322, 348/E5.091
See application file for complete search history.

(56) References Cited

U.S. PATENT DOCUMENTS

| | | | |
|---|---|---|---|
| 3,971,065 A | 7/1976 | Bayer | |
| 4,064,533 A | 12/1977 | Lampe et al. | |
| 4,584,609 A * | 4/1986 | Klein et al. | 348/322 |
| 5,235,198 A | 8/1993 | Stevens et al. | |
| 5,652,621 A | 7/1997 | Adams, Jr. et al. | |
| 6,462,779 B1 | 10/2002 | Philbrick | |
| 6,469,290 B1 | 10/2002 | Suzuki | |
| 6,507,365 B1 | 1/2003 | Nakamura et al. | |
| 6,744,466 B1 | 6/2004 | Furumiya | |
| 7,002,630 B1 * | 2/2006 | Iizuka | 348/322 |
| 2003/0193580 A1 | 10/2003 | Okamoto | |
| 2004/0150733 A1 | 8/2004 | Nagayoshi et al. | |
| 2005/0243195 A1 | 11/2005 | Parks | |
| 2005/0280726 A1 | 12/2005 | Parks et al. | |
| 2006/0007353 A1 | 1/2006 | Matsutani et al. | |
| 2006/0028570 A1 | 2/2006 | Okada et al. | |
| 2006/0044441 A1 | 3/2006 | Parks | |
| 2006/0125943 A1 | 6/2006 | Parks | |
| 2006/0170799 A1 | 8/2006 | Meisenzahl et al. | |
| 2007/0024931 A1 | 2/2007 | Compton et al. | |
| 2007/0024934 A1 * | 2/2007 | Andams et al. | 358/525 |
| 2007/0139545 A1 | 6/2007 | Parks | |
| 2007/0258002 A1 * | 11/2007 | Nay et al. | 348/311 |
| 2007/0296051 A1 | 12/2007 | Meisenzahl | |
| 2008/0007622 A1 | 1/2008 | Meisenzahl | |
| 2008/0204585 A1 * | 8/2008 | Meisenzahl et al. | 348/303 |

FOREIGN PATENT DOCUMENTS

EP 0 936 806 A2 8/1999

* cited by examiner

*Primary Examiner* — Sinh Tran
*Assistant Examiner* — Shahbaz Nazrul
(74) *Attorney, Agent, or Firm* — Bingham McCutchen LLP

(57) ABSTRACT

A CCD image sensor comprises photosensitive elements arranged in rows and columns, vertical CCDs each having vertical shift elements associated with respective ones of the photosensitive elements of a corresponding one of the columns, and a horizontal CCD coupled to each of the vertical CCDs. The horizontal CCD comprises horizontal shift elements of two different types interspersed with one another. The horizontal shift elements of the first type are configured to receive shifted charge packets directly from respective ones of the vertical CCDs. The horizontal shift elements of the second type are configured not to receive shifted charge packets directly from any of the vertical CCDs. This configuration facilitates binning of same-color pixels for both sparse CFA patterns and Bayer CFA patterns.

27 Claims, 4 Drawing Sheets

CHARGE-COUPLED DEVICE IMAGE SENSOR WITH EFFICIENT BINNING OF SAME-COLOR PIXELS

FIELD OF THE INVENTION

The present invention relates generally to electronic image sensors for use in digital cameras and other types of imaging devices, and more particularly to readout techniques for charge-coupled device (CCD) image sensors.

BACKGROUND OF THE INVENTION

A typical electronic image sensor comprises a number of photodiodes or other photosensitive elements arranged in a two-dimensional array. These elements are also commonly referred to as picture elements or "pixels" and the corresponding array is referred to as a pixel array.

In order to allow such an image sensor to produce a color image, the image sensor is configured with color filter elements of a color filter array (CFA) arranged over respective ones of the pixels. One commonly used type of CFA pattern is the Bayer pattern, disclosed in U.S. Pat. No. 3,971,065, entitled "Color Imaging Array," which is incorporated by reference herein. The Bayer CFA pattern provides each pixel with a color photoresponse exhibiting a predominant sensitivity to one of three designated portions of the visible spectrum. The three designated portions may be, for example, red, green and blue, or cyan, magenta and yellow. A given CFA pattern is generally characterized by a minimal repeating unit in the form of a subarray of contiguous pixels that acts as a basic building block for the pattern. Multiple copies of the minimal repeating unit are juxtaposed to form the complete pattern.

An image captured using an image sensor with a Bayer CFA pattern has only one color value at each pixel. Therefore, in order to produce a full color image, the missing color values at each pixel are interpolated from the color values of nearby pixels. Numerous such interpolation techniques are known in the art. See, for example, U.S. Pat. No. 5,652,621, entitled "Adaptive Color Plane Interpolation in Single Sensor Color Electronic Camera," which is incorporated by reference herein.

U.S. Patent Application Publication No. 2007/0024931, entitled "Image Sensor with Improved Light Sensitivity," which is incorporated by reference herein, discloses improved CFA patterns, including patterns which provide certain of the pixels with a panchromatic photoresponse. Such patterns are also generally referred to herein as "sparse" CFA patterns. A panchromatic photoresponse has a wider spectral sensitivity than those spectral sensitivities represented in the selected set of color photoresponses and may, for example, have high sensitivity across substantially the entire visible spectrum. Image sensors configured with the improved CFA patterns exhibit greater light sensitivity and are thus well-suited for use in applications involving low scene lighting, short exposure time, small aperture, or other restrictions on the amount of light reaching the image sensor.

In a CCD image sensor, vertical and horizontal CCDs are used to transfer collected charge from the photodiodes or other photosensitive elements of the pixel array. The collected charge from one photosensitive element for a given image capture period is often referred to as a charge packet. A typical CCD image sensor configuration includes a separate vertical CCD (VCCD) for each column of pixels, and at least one horizontal CCD (HCCD) coupled to outputs of the VCCDs. Each VCCD is configured as a shift register having shift elements associated with the respective photosensitive elements of its corresponding column of the pixel array. Outputs of the VCCDs are coupled to respective shift elements of the HCCD. Readout of the pixel array in this type of configuration generally involves shifting charge packets vertically through the VCCDs and into the HCCD, and then shifting the charge packets horizontally through the HCCD to an output amplifier. Often, multi-phase CCD structures are used for the VCCDs and HCCDs in a CCD image sensor. In such an arrangement, shift elements of the VCCD or HCCD are each separated into multiple parts or "phases" to facilitate the transfer of charge packets through these structures.

It is known to combine charge packets from neighboring pixels having the same color filter elements in order to reduce the total number of charge packets. This "color binning" results in reduced image resolution but allows faster image readout. Examples of color binning techniques are disclosed in U.S. Patent Application Publication Nos. 2005/0243195, 2005/0280726, 2006/0044441, 2006/0125943, and 2007/0139545, all of which are commonly assigned herewith and incorporated by reference herein.

Despite the considerable advances provided by the color binning techniques described in the above-cited references, a need remains for finer improvements, particularly in terms of color binning for CCD image sensors having sparse CFA patterns.

SUMMARY OF THE INVENTION

Illustrative embodiments of the invention provide CCD image sensors having VCCD and HCCD structures that facilitate binning of same-color pixels for a wide variety of CFA patterns, including sparse CFA patterns and Bayer CFA patterns.

In accordance with one aspect of the invention, a CCD image sensor comprises photodiodes or other photosensitive elements arranged in rows and columns, VCCDs each having vertical shift elements associated with respective ones of the photosensitive elements of a corresponding one of the columns, and an HCCD coupled to each of the VCCDs. The HCCD comprises horizontal shift elements of two different types interspersed with one another. The horizontal shift elements of the first type are configured to receive shifted charge packets directly from respective ones of the VCCDs. The horizontal shift elements of the second type are configured not to receive shifted charge packets directly from any of the VCCDs.

In a given one of the above-noted illustrative embodiments, the number of horizontal shift elements in the HCCD may be, for example, at least 50% greater than the number of VCCDs.

The horizontal shift elements in the HCCD may comprise two-phase or four-phase horizontal shift elements, single-phase or "virtual phase" horizontal shift elements, or other horizontal CCD structures.

In an illustrative embodiment in which the photosensitive elements are configured in accordance with a sparse CFA pattern, the VCCDs and HCCD are configured to provide binning of same-color charge packets without binning of panchromatic charge packets. More specifically, the binning of same-color pixels without binning of panchromatic charge packets is provided for a pair of the rows of photosensitive elements by a readout process that comprises a vertical shift in the VCCDs, followed by a horizontal shift in the HCCD, followed by another vertical shift in the VCCDs. The contents of the HCCD are then read out. This exemplary coordinated shifting process may be repeated for readout of additional row pairs of the pixel array.

In accordance with another aspect of the invention, the IHCCD may be reconfigurable into multiple modes of operation. For example, the HCCD may be operative in at least first and second different modes of operation, wherein in the first mode of operation the number of horizontal shift elements in the HCCD is greater than the number of VCCDs and in the second mode of operation the number of horizontal shift elements in the HCCD is equal to the number of VCCDs.

An image sensor in accordance with the invention may be advantageously implemented in a digital camera or other type of imaging device. The illustrative embodiments provide improved efficiency in the readout of a pixel array, for both sparse CFA patterns and Bayer CFA patterns. This improved efficiency is provided without requiring the use of two separate HCCDs, or the use of additional VCCDs with separate clocking, or the dumping of charge from certain rows of the pixel array.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

The present invention will be illustrated herein in conjunction with particular embodiments of digital cameras, image sensors and associated readout processes. It should be understood, however, that these illustrative arrangements are presented by way of example only, and should not be viewed as limiting the scope of the invention in any way. Those skilled in the art will recognize that the disclosed arrangements can be adapted in a straightforward manner for use with a wide variety of other types of imaging devices, image sensors and associated readout processes.

Figure 1:
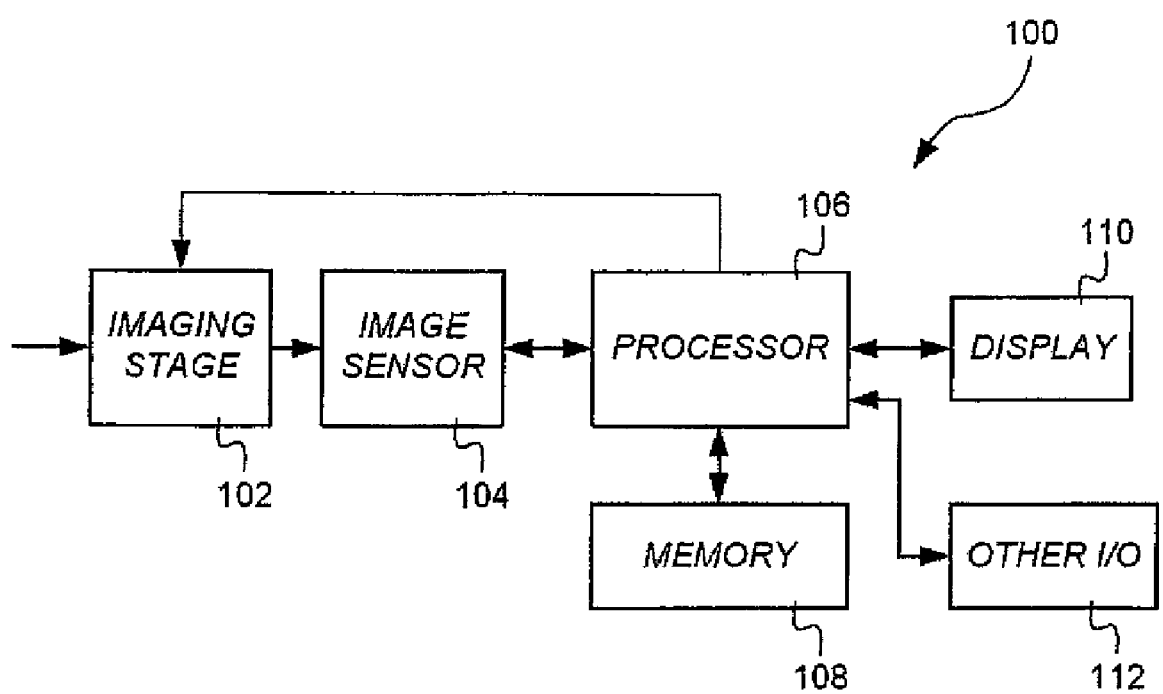
FIG. 1 is a block diagram of a digital camera having a CCD image sensor configured in accordance with an illustrative embodiment of the invention.

FIG. 1 shows a digital camera 100 in an illustrative embodiment of the invention. In the digital camera, light from a subject scene is input to an imaging stage 102. The imaging stage may comprise conventional elements such as a lens, a neutral density filter, an iris and a shutter. The light is focused by the imaging stage 102 to form an image on an image sensor 104, which converts the incident light to electrical signals. The digital camera 100 further includes a processor 106, a memory 108, a display 110, and one or more additional input/output (I/O) elements 112.

Although shown as separate elements in the embodiment of FIG. 1, the imaging stage 102 may be integrated with the image sensor 104, and possibly one or more additional elements of the digital camera 100, to form a compact camera module.

The image sensor 104 is a CCD image sensor. More detailed examples of the structural configuration of the image sensor will be described below in conjunction with FIGS. 2 and 3. The image sensor generally comprises a pixel array having a plurality of pixels arranged in rows and columns and may include additional circuitry associated with readout of the pixel array. This additional circuitry may comprise, for example, an analog signal processor for processing analog signals read out from the pixel array and an analog-to-digital converter for converting such signals to a digital form. These and other types of circuitry suitable for use in the digital camera 100 are well known to those skilled in the art and will therefore not be described in detail herein. Portions of the readout circuitry may be arranged external to the image sensor, or formed integrally with the pixel array, for example, on a common integrated circuit with photosensitive elements and other elements of the pixel array.

The image sensor 104 will typically be implemented as a color image sensor having an associated CFA pattern. Examples of CFA patterns that may be used with the image sensor 104 include those described in the above-cited U.S. Patent Application Publication No. 2007/0024931, although other CFA patterns may be used in other embodiments of the invention. As another example, a conventional Bayer pattern may be used, as disclosed in the abovecited U.S. Pat. No. 3,971,065.

The processor 106 may comprise, for example, a microprocessor, a central processing unit (CPU), an application-specific integrated circuit (ASIC), a digital signal processor (DSP), or other processing device, or combinations of multiple such devices. Various elements of the imaging stage 102 and the image sensor 104 may be controlled by timing signals or other signals supplied from the processor 106.

The memory 108 may comprise any type of memory, such as, for example, random access memory (RAM), read-only memory (ROM), Flash memory, disk-based memory, removable memory, or other types of storage elements, in any combination.

Functionality associated with readout of the pixel array and the processing of corresponding image data may be implemented at least in part in the form of software that is stored in memory 108 and executed by processor 106.

A given image captured by the image sensor 104 may be stored by the processor 106 in memory 108 and presented on display 110. The display 110 is typically an active matrix color liquid crystal display (LCD), although other types of displays may be used. The additional I/O elements 112 may comprise, for example, various on-screen controls, buttons or other user interfaces, network interfaces, memory card interfaces, etc.

Additional details regarding the operation of a digital camera of the type shown in FIG. 1 can be found, for example, in the above-cited U.S. Patent Application Publication No. 2007/0024931.

It is to be appreciated that the digital camera as shown in FIG. 1 may comprise additional or alternative elements of a type known to those skilled in the art. Elements not specifically shown or described herein may be selected from those known in the art. As noted previously, the present invention may be implemented in a wide variety of other types of digital cameras or imaging devices. Also, as mentioned above, certain aspects of the embodiments described herein may be implemented at least in part in the form of software executed by one or more processing elements of an imaging device. Such software can be implemented in a straightforward manner given the teachings provided herein, as will be appreciated by those skilled in the art.

Figure 2:
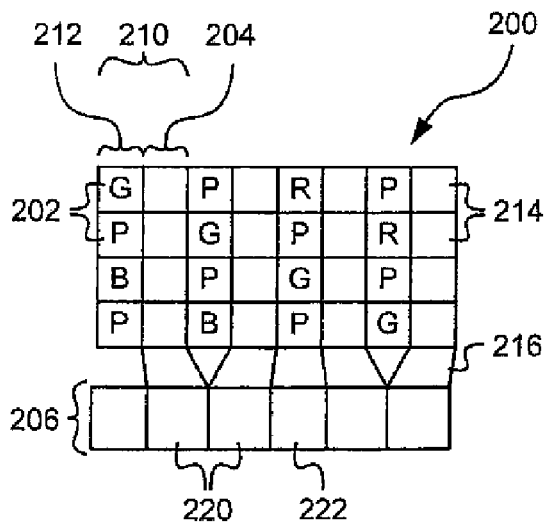
FIG. 2 illustrates a readout process for one possible implementation of the CCD image sensor of the digital camera of FIG. 1 having a sparse CFA pattern.
Figure 2:
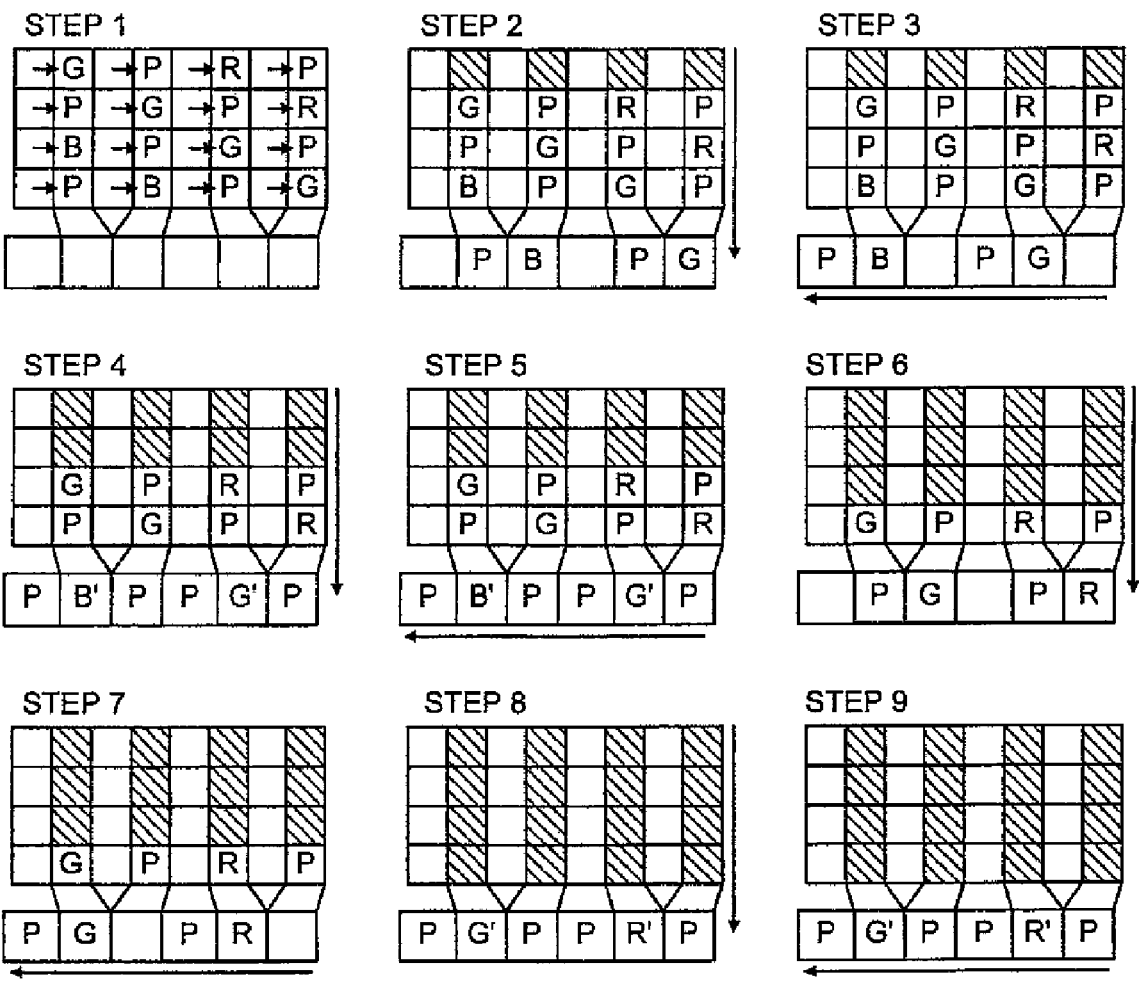
Figure 3:
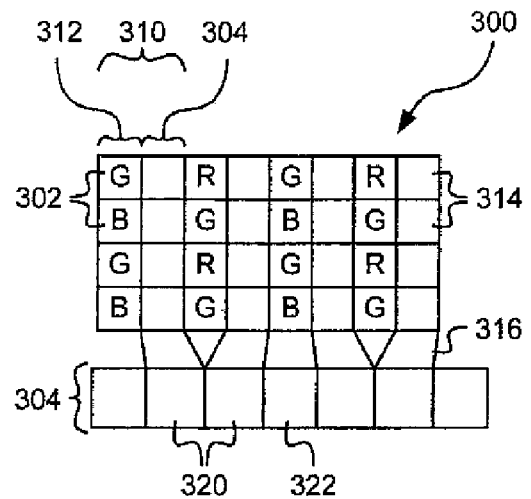
FIG. 3 illustrates a readout process for another possible implementation of the CCD image sensor of the digital camera of FIG. 1 having a Bayer CFA pattern.
Figure 3:
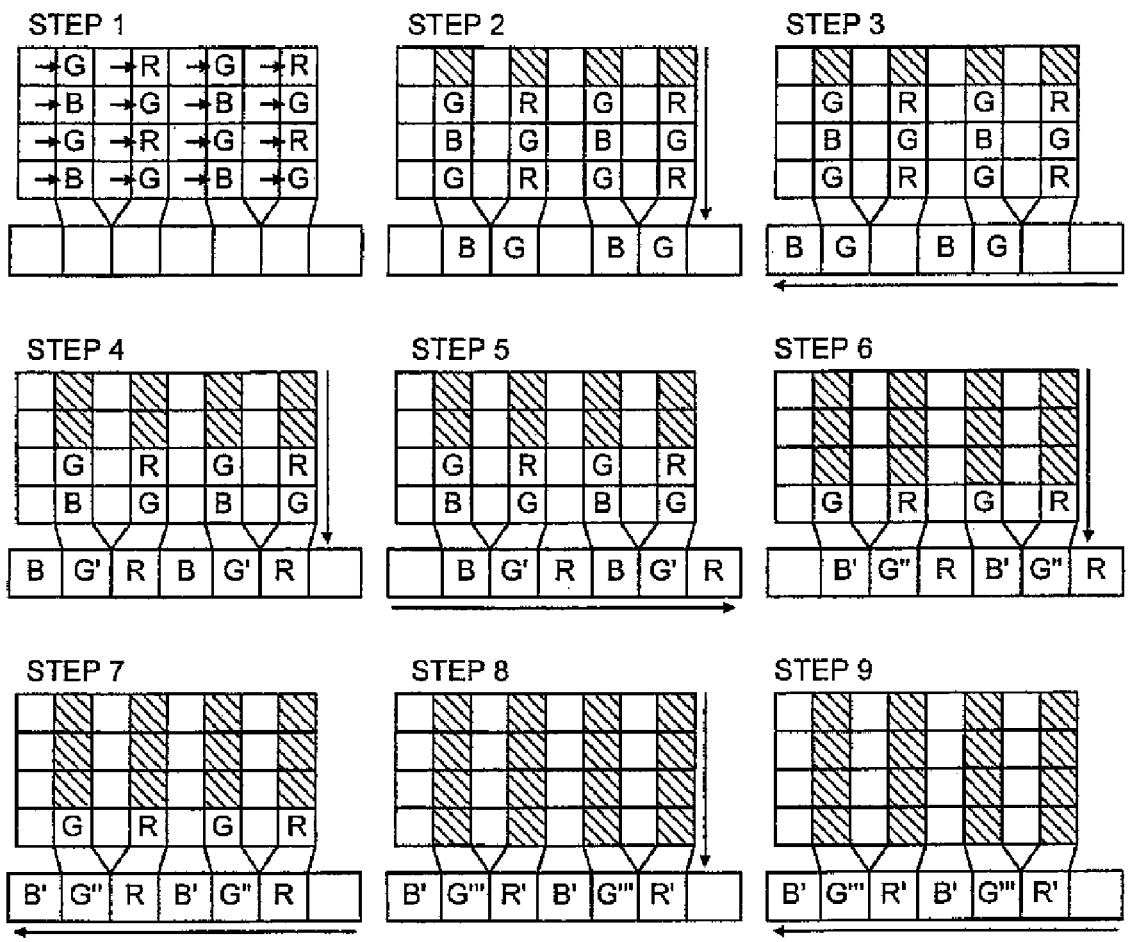

As indicated above, FIGS. 2 and 3 illustrate exemplary implementations of the CCD image sensor 104. It should be noted that these figures are simplified in order to clearly illustrate various aspects of the present invention, and are not necessarily drawn to scale. For example, these figures show a relatively small number of pixels, while in practice a given image sensor will typically include a much larger number of pixels. A given embodiment may include a variety of other features or elements that are not explicitly illustrated but would be familiar to one skilled in the art as being commonly associated with image sensors of the general type described. Either of the image sensors 200 or 300 shown in FIGS. 2 and 3 may be used, possibly with additional circuitry or other elements not explicitly shown, as image sensor 104 in the digital camera 100 of FIG. 1.

Referring now to FIG. 2, an image sensor 200 is shown. The figure includes a top diagram showing the general structure of the image sensor 200, and a sequence of nine additional diagrams showing the state of the image sensor 200 at respective steps of an exemplary readout process. These steps are labeled STEP 1 through STEP 9. The structure of the image sensor will initially be described with reference to the top diagram in the figure, followed by a description of the readout process itself.

The image sensor 200 includes a pixel array comprising a plurality of photosensitive elements 202 arranged in rows and columns. The photosensitive elements 202 may comprise, for example, photodiodes or photocapacitors. The image sensor further includes a plurality of vertical CCDs (VCCDs) 204 and a horizontal CCD (HCCD) 206. Each VCCD 204 is implemented as a shift register in a corresponding column 210 of the pixel array. A given column 210 of the pixel array more particularly includes a column 212 of photosensitive elements 202 and the corresponding VCCD 204 comprising vertical shift elements 214 associated with respective ones of the photosensitive elements 202 of that column. The vertical shift elements may be integrated within, coupled to, or otherwise associated with the respective photosensitive elements. For example, a given VCCD may combine photosensing and charge transport functionality, as is well known. Thus, the photosensitive elements may be implemented integrally with the vertical shift elements of the VCCDs. Numerous alternative arrangements are possible.

In the present embodiment, each individual vertical shift element 214 of VCCD 204 holds and transports an individual charge packet, and keeps its charge packet distinct from charge packets in vertical shift elements above and below the given vertical shift element. A given vertical shift element may be constructed in any of a variety of ways well known to those skilled in the art. These include two-phase or four-phase CCDs, single-phase or "virtual phase" CCDs, or other CCD structures. In the exemplary readout process illustrated by STEPS 1-9 in FIG. 2, the individual phase transitions involved in moving a charge packet from one vertical shift element to another vertical shift element are not explicitly shown, as these phase transitions depend on the particular structure chosen for the vertical shift elements. One skilled in the art would be familiar with the phase transitions associated with the above-noted exemplary CCD structures.

It should be noted that each VCCD 204 further includes an additional vertical shift element 216 located between the other vertical shift elements 214 of that VCCD 204 and the HCCD 206. This additional vertical shift element 216 is not associated with any particular one of the photosensitive elements 202, but instead facilitates transition between the VCCD 204 and the HCCD 206. Although shown as a single vertical shift element in FIG. 2, each additional vertical shift element 216 may comprise multiple vertical shift elements. Alternatively, the additional vertical shift elements 216 may be eliminated altogether, and the bottom vertical shift element 214 of each VCCD connected directly to the HCCD 206.

In the exemplary readout process illustrated by STEPS 1-9 in FIG. 2, the additional vertical shift required to move charge packets through the additional vertical shift elements 216 is not shown in order to simplify the explanation of the readout process. Nevertheless, one skilled in the art will recognize that one or more additional vertical shifts will be required to move charge packets vertically through the additional vertical shift elements 216, depending on the particular implementation of the additional vertical shift element, before the charge packets reach the HCCD 206.

The HCCD 206 includes horizontal shift elements of two different types interspersed with one another. The first type horizontal shift elements 220 are directly coupled to respective ones of the VCCDs 204, while the second type horizontal shift elements 222 are not directly coupled to any of the VCCDs. Here, the term "directly coupled" to a VCCD means configured to receive a shifted charge packet directly from that VCCD. The first type horizontal shift elements 220 are configured to receive shifted charge packets directly from respective ones of the VCCDs. The second type horizontal shift elements 222 are not configured to receive shifted charge packets directly from any of the VCCDs. Both first type horizontal shift elements 220 and second type horizontal shift elements 222 are configured to receive shifted charge packets directly from another horizontal shift element of either type, thereby permitting horizontal shifting of charge packets sequentially through the horizontal shift elements of the HCCD 206.

It can be seen that the number of horizontal shift elements 220 and 222 in the HCCD 206 is greater than the number of VCCDs 204. More specifically, there are four VCCDs 204 in the image sensor 200, one for each of the four columns of pixels of the pixel array. The HCCD 206 includes six horizontal shift elements, including two pairs of first type horizontal shift elements 220 and two second type horizontal shift elements 222, with individual ones of the second type horizontal shift elements interspersed between pairs of first type horizontal shift elements. Due to the small size of the exemplary array in FIG. 2, there is one second type horizontal shift element located between the two pairs of first type horizontal shift elements, with the remaining second type horizontal shift element located at the left end of the HCCD. Nevertheless, it is easily recognized that this pattern of one second type horizontal shift element arranged between two pairs of first type horizontal shift elements is scalable to accommodate a larger array of pixels.

The HCCD 206 therefore includes substantially more horizontal shift elements than there are VCCDs 204. Specifically, in FIG. 2, the HCCD 206 includes 50% more horizontal shift elements than there are VCCDs 204. Only the first type horizontal shift elements 220 are directly coupled to respective ones of the VCCDs 204. This exemplary configuration of the HCCD 206 advantageously facilitates the binning of same-color pixels when reading out the pixel array of the image sensor 200, as will be described in greater detail below.

Although this embodiment is configured with the HCCD having 50% more horizontal shift elements than there are VCCDs, other embodiments could have more or fewer horizontal shift elements. Generally, a given embodiment of the invention will comprise an HCCD that has more horizontal shift elements than there are VCCDs.

Each individual horizontal shift element 220 or 222 of HCCD 206 holds and transports an individual charge packet, and keeps its charge packet distinct from charge packets in horizontal shift elements to the left or right of the given horizontal shift element. Like the vertical shift elements, a given horizontal shift element may be constructed using two-phase or four-phase CCDs, single-phase or "virtual phase" CCDs, or other known CCD structures. Furthermore, it is not necessary for the horizontal shift elements 220 and 222 of HCCD 206 to be constructed using the same type of CCD structures used to construct the vertical shift elements 214 or 216 of the VCCDs 204. In the exemplary readout process illustrated by STEPS 1-9 in FIG. 2, the individual phase transitions involved in moving a charge packet from one horizontal shift element to another horizontal shift element are not explicitly shown, as these phase transitions depend on the particular structure chosen for the horizontal shift elements.

In the FIG. 2 embodiment, the first type and second type horizontal shift elements are interspersed with one another such that there is one second type horizontal shift element 222 arranged between two first type horizontal shift elements 220. Other types of interspersal of such elements are possible in alternative embodiments. For example, two or more second type horizontal shift elements can be grouped together between two first type horizontal shift elements.

It should also be noted that the VCCDs 204 and HCCD 206 may be integrated with the pixel array on a common integrated circuit, or may be implemented at least in part in readout circuitry that is separate from the pixel array. As indicated above, numerous conventional arrangements for structuring such elements are well known to those skilled in the art and accordingly will not be described in detail herein.

The image sensor 200 utilizes an exemplary sparse CFA pattern. Each of the photosensitive elements 202 of the pixel array is labeled with an indicator of its corresponding color, which may be red (R), blue (B), green (G) or panchromatic (P), in accordance with the sparse CFA pattern. The particular sparse CFA pattern used in this embodiment is a panchromatic checkerboard pattern of the type disclosed in the above-cited U.S. Patent Application Publication No. 2007/0024931, although numerous other CFA patterns may be used. The minimal repeating unit for this panchromatic checkerboard pattern includes 16 contiguous pixels arranged as follows:

| | | | |
|---|---|---|---|
| Y | P | X | P |
| P | Y | P | X |
| Z | P | Y | P |
| P | Z | P | Y | where P represents one of the panchromatic pixels and X, Y and Z represent respective color pixels. In this particular embodiment, X, Y and Z are red, green and blue, respectively. Alternatively, X, Y and Z may be individually selected in a different manner from red, green and blue, or may be individually selected from another set of colors, such as cyan, magenta and yellow. Patterns with other minimal repeating units, such as minimal repeating units of at least twelve pixels as described in the above-cited U.S. Patent Application Publication No. 2007/0024931, may be used.

The upper two rows of the pixel array as shown in FIG. 2 are referred to herein as a red/green row pair, and the lower two rows of the pixel array are referred to herein as a blue/green row pair. The sequence of nine diagrams labeled STEP 1 through STEP 9 in FIG. 2 illustrates an exemplary process for readout of the blue/green and red/green row pairs of the pixel array using the VCCDs 204 and the HCCD 206. This readout process generally provides binning of same-color pixels and no binning of panchromatic pixels, as will be described.

Prior to STEP 1 of the readout process, light incident on the image sensor 200 is integrated in the photosensitive elements 202 to form respective charge packets. As indicated previously herein, collected charge from one photosensitive element for a given image capture period is referred to as a charge packet. A given such charge packet may be more specifically referred to as color or panchromatic, depending on the type of pixel that generated it.

In STEP 1, the charge packets are transferred from the photosensitive elements 202 to the respective vertical shift elements 214 of the VCCDs 204.

STEPS 2 through 5 generally involve coordinated vertical and horizontal shifting of the charge packets in the VCCDs 204 and HCCD 206 in a manner that achieves binning of same-color pixels without binning of panchromatic pixels. More specifically, STEP 2 provides a vertical downward shift of the charge packets in the VCCDs 204, shifting the bottom row of charge packets from the VCCDs into respective first type horizontal shift elements 220 of the HCCD 206. This is followed by a leftward shift of the charge packets in HCCD 206 shown in STEP 3. Another vertical downward shift of the charge packets in the VCCDs 204, shown in STEP 4, shifts the next row of charge packets from the VCCDs into the HCCD 206. Finally, the charge packets in the HCCD 206 are read out in STEP 5.

STEPS 6 through 9 correspond generally to respective STEPS 2 through 5 and permit the readout of the red/green row pair of the array to proceed in a similar manner. It is easily seen that STEPS 2 through 5 can be repeated in order to read an array of arbitrary vertical height.

As noted previously, in the FIG. 2 embodiment two same-color pixels in each row pair are binned without binning of the panchromatic pixels. For example, the two blue charge packets generated in the blue/green row pair are combined in the HCCD, and the two green charge packets generated in the blue/green row pair are combined in the HCCD. Thus, only six charge packets are read out from the HCCD for the eight pixels of the row pair, which results in a 33% increase in frame rate. Furthermore, by binning the same-color pixels without binning the panchromatic pixels, an approximate photographic speed match between color pixels and panchromatic pixels is achieved.

FIG. 2 and other figures herein use prime symbols to indicate pixel binning. Thus, for example, G denotes an unbinned green pixel, G' denotes two G pixels binned together, G" denotes three G pixels binned together, and G'" denotes four G pixels binned together. Similar binning notations are used for B and R pixels.

It was mentioned above that the techniques of the present invention are applicable to a wide variety of CFA patterns, including Bayer CFA patterns. One possible alternative embodiment of the invention includes image sensor 300 which utilizes a Bayer CFA pattern as shown in FIG. 3. The minimal repeating unit in this well-known CFA pattern includes four contiguous pixels: one red, two green and one blue. Like FIG. 2, FIG. 3 includes a top diagram showing the general structure of the image sensor, and a sequence of nine additional diagrams showing the state of the image sensor at respective steps of an exemplary readout process. These steps are labeled STEP 1 through STEP 9. The structure of the image sensor will initially be described with reference to the top diagram in the figure, followed by a description of the readout process itself.

The image sensor 300 includes a pixel array comprising a plurality of photosensitive elements 302 arranged in rows and columns. The image sensor further includes a plurality of VCCDs 304 and an HCCD 306. Each VCCD 304 is implemented in a corresponding column 310 of the pixel array. A given column 310 of the pixel array more particularly includes a column 312 of photosensitive elements 302 and the corresponding VCCD 304 comprising vertical shift elements 314 associated with respective ones of the photosensitive elements 302. As in the FIG. 2 embodiment, each VCCD 304 further includes an additional vertical shift element 316 that is not associated with any particular one of the photosensitive elements. The discussion above regarding the function and construction of vertical shift elements 214 and additional vertical shift elements 216 in FIG. 2 applies equally to vertical shift elements 314 and additional vertical shift elements 316 in FIG. 3.

Like the HCCD 206 in the FIG. 2 embodiment, the HCCD 306 of image sensor 300 in FIG. 3 includes horizontal shift elements of two different types interspersed with one another. The first type horizontal shift elements 320 are directly coupled to respective ones of the VCCDs 304, while the second type horizontal shift elements 322 are not directly coupled to any of the VCCDs. Thus, the number of horizontal shift elements 320 and 322 in the HCCD 306 is greater than the number of VCCDs 304.

More specifically, there are four VCCDs 304 in the image sensor 300, one for each of the four columns of pixels of the pixel array. Each of the VCCDs 304 includes four vertical shift elements 314, one for each of the photosensitive elements 302, plus an additional vertical shift element 316 as noted above. The HCCD 306 includes six horizontal shift elements 320 and 322, plus an additional horizontal shift element 322 located at the right end of the HCCD 306. The relevance of this additional horizontal shift element will be explained below. Thus, the HCCD 306 includes over 50% more horizontal shift elements than there are VCCDs 304. As in the FIG. 2 embodiment, this exemplary HCCD configuration advantageously facilitates the binning of same-color pixels when reading out the pixel array of the image sensor 300, as will be described in greater detail below. Other embodiments may configure the HCCD to have other numbers of horizontal shift elements greater than the number of VCCDs.

The HCCD 306 of image sensor 300 is assumed to be a bidirectional HCCD, that is, an HCCD capable of shifting horizontally in two directions, denoted left and right. This is in contrast to the HCCD 206 of FIG. 2, which was required to shift horizontally in only a single direction. Since HCCD 306 is a bidirectional HCCD, the above-noted additional second type horizontal shift element 322 is required on the right end of the HCCD to hold a charge packet after a rightward shift of the charge packets in the HCCD.

The sequence of diagrams in FIG. 3 illustrates an exemplary process for readout of the entire pixel array using the VCCDs 304 and the HCCD 306. As mentioned above, the image sensor 300 is shown at nine different points in time, labeled STEPS 1 through 9, each corresponding to a different step of the readout process. This readout process generally provides binning of sets of four green pixels, binning of sets of two red pixels and binning of sets of two blue pixels, as will be described.

In STEP 1 of the readout process, charge packets generated in the photosensitive elements 302 are transferred to the respective vertical shift elements 314 of the VCCDs 304. This involves horizontal shifting of the charge packets into the VCCDs, as indicated in the figure.

STEPS 2 through 8 generally involve coordinated vertical and horizontal shifting of the charge packets in the VCCDs 304 and HCCD 306 in a manner that achieves the above-noted binning of same-color pixels.

More specifically, in STEP 2 the charge packets are shifted vertically into the HCCD 306, followed by a left shift of the HCCD in STEP 3. There is then another vertical shift of charge packets into the HCCD in STEP 4, followed by a right shift of the HCCD in STEP 5. This is in turn followed by another vertical shift of charge packets into the HCCD in STEP 6, then a left shift of the HCCD in STEP 7. A fourth vertical shift of charge packets into the HCCD occurs in STEP 8. Finally, the charge packets in the HCCD are read out in STEP 9.

As noted previously, in the FIG. 3 embodiment, sets of four green pixels are binned, sets of two red pixels are binned and sets of two blue pixels are binned. The complete array as shown in the figure includes eight green pixels, four blue pixels and four red pixels. Through the binning process, the 16 original charge packets are reduced to six charge packets as shown in STEP 9. Thus, only six charge packets are read out from the HCCD for the 16 pixels of the pixel array, which results in a 167% increase in frame rate.

Figure 4:
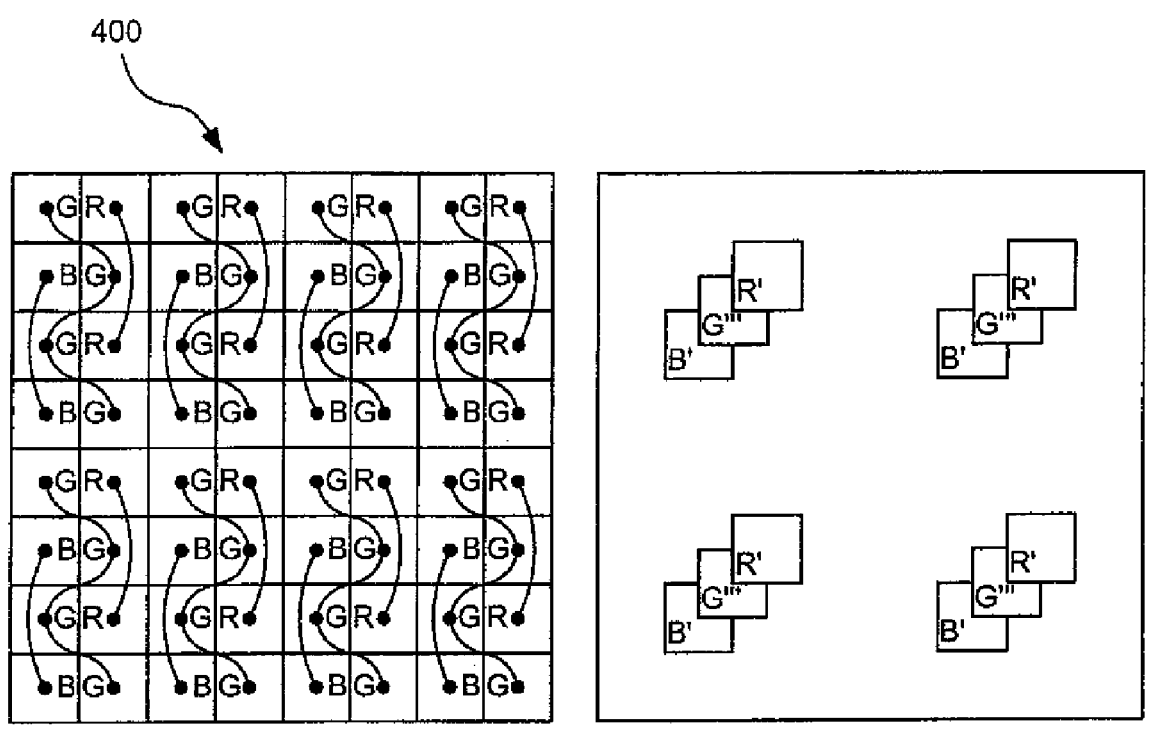
FIG. 4 further illustrates the readout process of the CCD image sensor of FIG. 3.

FIG. 4 illustrates the readout process of the FIG. 3 embodiment as applied to a larger pixel array 400. The pixel array 400 shown on the right side of this diagram comprises four sub-arrays each having 16 pixels configured as shown in FIG. 3. The lines connecting the various pixels in the array 400 illustrate the pixels that are binned together in the readout process. The left side of the diagram may be viewed as representing the resulting charge packets after binning, which as indicated above will include a total of six charge packets for each sub-array of 16 pixels.

The use of a bidirectional HCCD as in the FIG. 3 embodiment provides very flexible vertical binning arrangements while keeping the colors separate and while confining increased charge capacity requirements to the HCCD.

It should be noted that this bidirectional HCCD arrangement allows a variety of additional or alternative Bayer binning modes. For example, three green pixels may be binned in a zig-zag fashion while also binning two red pixels or two blue pixels but with no binning of the remaining color. This is useful, for example, in an embodiment in which the binned and unbinned colors are used together to provide extended dynamic range.

The illustrative embodiments of FIGS. 2 and 3 provide improved binning of same-color pixels, while avoiding the drawbacks of conventional arrangements. For example, certain conventional color-binning techniques may involve the use of two separate HCCDs, or the use of additional VCCDs with separate clocking, or the dumping of charge from certain rows of the pixel array. The use of two separate HCCDs or additional VCCDs with separate clocking complicates the image sensor operation and requires additional clock signals and expense. Dumping charge reduces the sensitivity of the image sensor and can create aliasing errors. The illustrative embodiments avoid these problems by configuring a single HCCD with a number of horizontal shift elements that is greater than the number of VCCDs, and providing coordinated vertical and horizontal shifting in the readout process as described above.

Alternative embodiments of the invention may configure the HCCD to be operative in at least first and second different modes of operation. For example, in the first mode of operation, the HCCD may be configured such that the number of horizontal shift elements in the HCCD is greater than the number of VCCDs, as in the embodiments of FIGS. 2 and 3.

However, the HCCD may then be reconfigurable into a second mode of operation in which the number of horizontal shift elements in the HCCD is substantially the same as the number of VCCDs. Such a reconfiguration may be provided, for example, by manipulation of the phase clocking of the HCCD.

The invention has been described in detail with particular reference to certain illustrative embodiments thereof but it will be understood that variations and modifications can be effected within the scope of the invention as set forth in the appended claims. For example, the invention can be implemented in other types of image sensors and digital imaging devices, using alternative VCCD and HCCD structures. The particular VCCD and HCCD structures used may include single-phase structures, or two-phase, pseudo-two-phase or other types of multi-phase structures, in any combination. The particular manner in which first type horizontal shift elements and second type horizontal shift elements are interspersed with one another can be varied. In addition, features such as the particular types of CFA patterns that are used, the configuration of the pixel array, and the readout process sequences, may be altered in other embodiments to accommodate the needs of other image capture devices and operating modes. Also, although the illustrative embodiments are configured for progressive scanning of the pixel array, these arrangements may be adapted in a straightforward manner to implement interlaced scanning of the pixel array. Furthermore, the particular relationship between the number of horizontal shift elements of the HCCD and the number of VCCDs may be altered in other embodiments. These and other alternative embodiments will be readily apparent to those skilled in the art.

PARTS LIST

| | |
|---|---|
| 100 | digital camera |
| 102 | imaging stage |
| 104 | image sensor |
| 106 | processor |
| 108 | memory |
| 110 | display |
| 112 | input/output (I/O) elements |
| 200 | image sensor |
| 202 | photosensitive elements |
| 204 | vertical CCD (VCCD) |
| 206 | horizontal CCD (HCCD) |
| 210 | pixel array column |
| 212 | photosensitive element column |
| 214 | vertical shift elements |
| 216 | additional vertical shift elements |
| 220 | first type horizontal shift elements |
| 222 | second type horizontal shift elements |
| 300 | image sensor |
| 302 | photosensitive elements |
| 304 | VCCD |
| 306 | HCCD |
| 310 | pixel array column |
| 312 | photosensitive element column |
| 314 | vertical shift elements |
| 316 | additional vertical shift elements |
| 320 | first type horizontal shift elements |
| 322 | second type horizontal shift elements |
| 400 | pixel array |

The invention claimed is:

1. A charge-coupled device (CCD) image sensor, comprising:
    a plurality of photosensitive elements arranged in rows and columns;
    a plurality of vertical CCDs each having vertical shift elements associated with respective ones of the photosensitive elements of a corresponding one of the columns; and
    a horizontal CCD coupled to the vertical CCDs;
    wherein the horizontal CCD comprises a repetitive arrangement of a group of three horizontal shift elements, wherein at least two adjacent horizontal shift elements in each group are configured to receive shifted charge packets directly from respective ones of the vertical CCDs and at least one horizontal shift element is configured to receive charge packets directly from an adjacent horizontal shift element.

2. The image sensor of claim 1 wherein the horizontal shift elements comprise two-phase horizontal shift elements.

3. The image sensor of claim 1 wherein the horizontal CCD is operative in at least first and second different modes of operation, wherein in the first mode of operation the number of horizontal shift elements in the horizontal CCD is greater than the number of vertical CCDs and in the second mode of operation the number of horizontal shift elements in the horizontal CCD is equal to the number of vertical CCDs.

4. The image sensor of claim 1 wherein the photosensitive elements are configured in accordance with a sparse color filter array pattern.

5. The image sensor of claim 4 wherein the horizontal CCD is configured to provide binning of same-color charge packets without binning of panchromatic charge packets.

6. The image sensor of claim 5 wherein the binning of same-color charge packets without binning of panchromatic charge packets is provided for a pair of the rows of photosensitive elements by a readout process that comprises a vertical shift in the vertical CCDs, followed by a horizontal shift in the horizontal CCD, followed by another vertical shift in the vertical CCDs.

7. The image sensor of claim 4 wherein a minimal repeating unit of the sparse color filter array pattern comprises 16 contiguous pixels arranged as follows:

| | | | |
|---|---|---|---|
| Y | P | X | P |
| P | Y | P | X |
| Z | P | Y | P |
| P | Z | P | Y | where P represents a panchromatic pixel and X, Y and Z represent pixels having first, second and third colors, respectively.

8. The image sensor of claim 1 wherein the photosensitive elements are configured in accordance with a Bayer color filter array pattern.

9. The image sensor of claim 8 wherein the horizontal CCD comprises a bidirectional horizontal CCD.

10. The image sensor of claim 9 wherein the horizontal CCD is configured to provide binning of four green charge packets, binning of two red charge packets and binning of two blue charge packets.

11. The image sensor of claim 10 wherein the binning of four green charge packets, binning of two red charge packets and binning of two blue charge packets is provided for a given set of two pairs of adjacent ones of the rows by a readout process that comprises a first vertical shift in the vertical CCDs, followed by a shift in a first direction in the horizontal CCD, followed by a second vertical shift in the vertical CCDs, followed by a shift in a second direction in the horizontal CCD, followed by a third vertical shift in the vertical CCDs, followed by another shift in the first direction in the horizontal CCD, followed by a fourth vertical shift in the vertical CCDs.

12. The image sensor of claim 9 wherein the horizontal CCD is configured to provide binning of three green charge packets, binning of either two red charge packets or two blue charge packets, and no binning of charge packets of the remaining color.

13. A method of reading out a charge-coupled device (CCD) image sensor, the image sensor comprising a plurality of photosensitive elements arranged in rows and columns, a plurality of vertical CCDs each having vertical shift elements associated with respective ones of the photosensitive elements of a corresponding one of the columns, and a horizontal CCD coupled to the vertical CCDs, wherein the horizontal CCD comprises a repetitive arrangement of a group of three horizontal shift elements where at least two adjacent horizontal shift elements in each group are configured to receive shifted charge packets directly from respective ones of the vertical CCDs and at least one horizontal shift element is configured to receive charge packets from an adjacent horizontal shift element, the method comprising:

shifting charge packets vertically from each vertical CCD into respective horizontal shift elements;
shifting the charge packets in the horizontal CCD horizontally one horizontal shift element; and
combining only respective ones of the charge packets in each group of three horizontal shift elements with additional charge packets by shifting charge packets vertically from each vertical CCD into respective horizontal shift elements.

14. The method of claim 13 wherein the horizontal CCD is operative in at least first and second different modes of operation, wherein in the first mode of operation the number of horizontal shift elements in the horizontal CCD is greater than the number of vertical CCDs and in the second mode of operation the number of horizontal shift elements in the horizontal CCD is equal to the number of vertical CCDs.

15. The method of claim 13 wherein the shifting steps further comprise a vertical shift in the vertical CCDs, followed by a horizontal shift in the horizontal CCD, followed by another vertical shift in the vertical CCDs.

16. The method of claim 13 wherein the shifting steps further comprise at least a first vertical shift in the vertical CCDs, followed by a shift in a first direction in the horizontal CCD, followed by a second vertical shift in the vertical CCDs, followed by a shift in a second direction in the horizontal CCD, followed by a third vertical shift in the vertical CCDs, followed by another shift in the first direction in the horizontal CCD, followed by a fourth vertical shift in the vertical CCDs.

17. The method of claim 13 wherein the photosensitive elements are configured in accordance with a sparse color filter array pattern and the combining only respective ones of the charge packets in each group of three horizontal shift elements with additional charge packets by shifting charge packets vertically from each vertical CCD into respective horizontal shift elements comprises combining only respective same-color charge packets.

18. A digital imaging device comprising:
a charge-coupled device (CCD) image sensor; and
one or more processing elements configured to process outputs of the image sensor to generate a digital image;
wherein said image sensor comprises:
a plurality of photosensitive elements arranged in rows and columns;
a plurality of vertical CCDs each having vertical shift elements associated with respective ones of the photosensitive elements of a corresponding one of the columns; and
a horizontal CCD coupled to each of the vertical CCDs;
wherein the horizontal CCD comprises a repetitive arrangement of a group of three horizontal shift elements, wherein at least two adjacent horizontal shift elements in each group are configured to receive shifted charge packets directly from respective ones of the vertical CCDs and at least one horizontal shift element is configured to receive charge packets directly from an adjacent horizontal shift element.

19. The digital imaging device of claim 18 wherein said digital imaging device comprises a digital camera.

20. A charge-coupled device (CCD) image sensor, comprising:
a plurality of photosensitive elements arranged in rows and columns and configured in accordance with a sparse color filter array pattern;
a plurality of vertical CCDs each having vertical shift elements associated with respective ones of the photosensitive elements of a corresponding one of the columns; and
a horizontal CCD, configured to provide binning of same-color charge packets without binning of panchromatic charge packets, coupled to each of the vertical CCDs,
wherein the horizontal CCD comprises horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs.

21. The image sensor of claim 20 wherein the binning of same-color charge packets without binning of panchromatic charge packets is provided for a pair of the rows of photosensitive elements by a readout process that comprises a vertical shift in the vertical CCDs, followed by a horizontal shift in the horizontal CCD, followed by another vertical shift in the vertical CCDs.

22. A charge-coupled device (CCD) image sensor, comprising:
a plurality of photosensitive elements arranged in rows and columns and configured in accordance with a sparse color filter array pattern, a minimal repeating unit of the sparse color filter array pattern comprising 16 contiguous pixels arranged as follows:

| Y | P | X | P |
| P | Y | P | X |
| Z | P | Y | P |
| P | Z | P | Y | where P represents a panchromatic pixel and X, Y and Z represent pixels having first, second and third colors, respectively;
a plurality of vertical CCDs each having vertical shift elements associated with respective ones of the photosensitive elements of a corresponding one of the columns; and
a horizontal CCD coupled to each of the vertical CCDs,
wherein the horizontal CCD comprises horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs.

23. A charge-coupled device (CCD) image sensor, comprising:
a plurality of photosensitive elements arranged in rows and columns and configured in accordance with a Bayer color filter array pattern;
a plurality of vertical CCDs each having vertical shift elements associated with respective ones of the photosensitive elements of a corresponding one of the columns; and
a bidirectional horizontal CCD coupled to each of the vertical CCDs and configured to provide binning of four green charge packets, binning of two red charge packets and binning of two blue charge packets,
wherein the horizontal CCD comprises horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs.

24. The image sensor of claim 23 wherein the binning of four green charge packets, binning of two red charge packets and binning of two blue charge packets is provided for a given set of two pairs of adjacent ones of the rows by a readout process that comprises a first vertical shift in the vertical CCDs, followed by a shift in a first direction in the horizontal CCD, followed by a second vertical shift in the vertical CCDs, followed by a shift in a second direction in the horizontal CCD, followed by a third vertical shift in the vertical CCDs, followed by another shift in the first direction in the horizontal CCD, followed by a fourth vertical shift in the vertical CCDs.

25. A charge-coupled device (CCD) image sensor, comprising:
a plurality of photosensitive elements arranged in rows and columns and configured in accordance with a Bayer color filter array pattern;
a plurality of vertical CCDs each having vertical shift elements associated with respective ones of the photosensitive elements of a corresponding one of the columns; and
a bidirectional horizontal CCD coupled to each of the vertical CCDs and configured to provide binning of three green charge packets, binning of either two red charge packets or two blue charge packets, and no binning of charge packets of the remaining color;
wherein the horizontal CCD comprises and horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs.

26. A method of reading out a charge-coupled device (CCD) image sensor, the image sensor comprising a plurality of photosensitive elements arranged in rows and columns, the method comprising:
shifting charge packets through a plurality of vertical CCDs each having vertical shift elements associated with respective ones of the photosensitive elements of a corresponding one of the columns; and
shifting the charge packets through a horizontal CCD coupled to each of the vertical CCDs,
wherein the horizontal CCD comprises horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs, and
wherein the shifting steps further comprise at least a first vertical shift in the vertical CCDs, followed by a shift in a first direction in the horizontal CCD, followed by a second vertical shift in the vertical CCDs, followed by a shift in a second direction in the horizontal CCD, followed by a third vertical shift in the vertical CCDs, followed by another shift in the first direction in the horizontal CCD, followed by a fourth vertical shift in the vertical CCDs.

27. A method of reading out a charge-coupled device (CCD) image sensor, the image sensor comprising a plurality of photosensitive elements arranged in rows and columns and configured in accordance with a sparse color filter array pattern, the method comprising the steps of:
shifting charge packets through a plurality of vertical CCDs each having vertical shift elements associated with respective ones of the photosensitive elements of a corresponding one of the columns; and
shifting the charge packets through a horizontal CCD coupled to each of the vertical CCDs;
wherein the horizontal CCD comprises horizontal shift elements of two different types interspersed with one another, with horizontal shift elements of the first type being configured to receive shifted charge packets directly from respective ones of the vertical CCDs and horizontal shift elements of the second type being configured not to receive shifted charge packets directly from any of the vertical CCDs, and
wherein the shifting steps provide binning of same-color charge packets without binning of panchromatic charge packets.

* * * * *